Jan. 17, 1939.                W. C. OSBORN                 2,144,544
              TRIM PANEL AND METHOD OF MAKING SAME
                        Filed Sept. 3, 1936
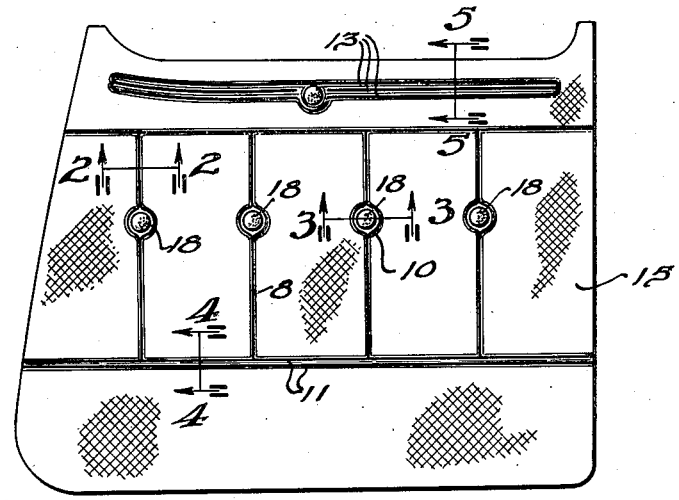
Fig. 1.
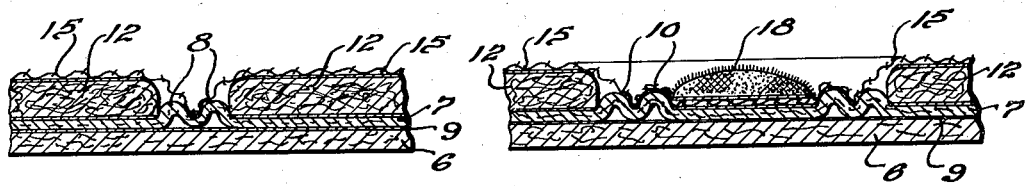
Fig. 2.             Fig. 3.
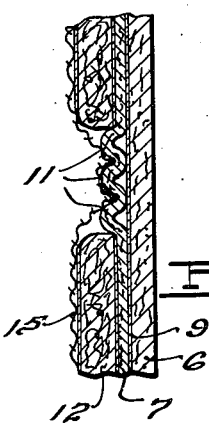    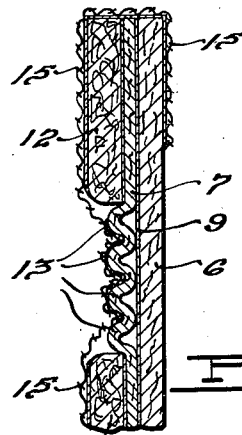
Fig. 4.             Fig. 5.
INVENTOR
William C. Osborn.
BY
Harness, Dickey, Pierce & Hann.
ATTORNEYS.

Patented Jan. 17, 1939

2,144,544

UNITED STATES PATENT OFFICE 2,144,544

TRIM PANEL AND METHOD OF MAKING SAME

William C. Osborn, Detroit, Mich., assignor to The Murray Corporation of America, Detroit, Mich., a corporation of Delaware Application September 3, 1936, Serial No. 99,230

3 Claims. (Cl. 154—2)

This invention relates to inner trim panels for automotive vehicles. More particularly, it relates to a novel and particularly attractive form of inner trim panel and to a simplified and greatly improved method of making the same.

It is a primary object of the present invention to provide a method of manufacturing inner trim panels which method may be economically practiced and which produces inner trim panels having a novel and unique exterior configuration rendering them particularly adaptable for ornamental installation on the interior of vehicle bodies.

Trim panels have been long used for the purpose of covering predetermined areas of the interior of automotive vehicles and for the purpose of covering the interior surface of vehicle doors beneath the window openings therein. Inner trim panels are now primarily used for this latter purpose.

It is a primary object of the present invention to construct an inner trim panel having the surface thereof decorated in order to break up the usual monotony of surface area resulting from the utilization of a single inner trim panel having no exterior surface decoration.

A still further object of the present invention is to provide an inner trim panel construction in which the fabric finish material is secured to the backing sheet with which it is to be associated, in such a manner that it is not only attached to the marginal edges of the backing sheet but is also secured to the backing sheet in relatively restricted zones at spaced points throughout the surface of the trim panel construction as a whole.

Yet another important object of the invention is to provide a novel backing sheet construction. Heretofore backing sheets have been made of a single section of relatively heavy cardboard blanked to substantially the configuration of the inner trim panel with which they are associated. In order to accentuate the surface decorations of the inner trim panel as a whole, it has been found virtually essential to emboss the cardboard backing sheet in order that it too, will materially contribute to the decorative effect provided. In order to accomplish this end, it has been ascertained that cardboard of sufficiently heavy construction to provide the inherent rigidity necessary in trim panels of this general type is too thick to satisfactorily respond to embossing operations for varying the surface configuration thereof. Consequently, the present invention contemplates the provision of a backing sheet of laminated structure, preferably formed of a pair of sections of cardboard, one substantially heavier than the other. These two sections of cardboard are adhesively bonded together but prior to such bonding, the upper or thinner section of cardboard is embossed in accordance with the desired surface decorations to be produced.

Many other and further important objects, advantages, and features of the present invention will become clearly apparent from the following specification when considered in connection with the accompanying drawing forming a part thereof.

In the drawing:

Figure 1 is an elevational view of one form of trim panel embodying the improvements of the present invention;

Figure 2 is an enlarged fragmentary sectional view taken substantially on the line 2—2 of Fig. 1 illustrating the various members making up the improved trim panel construction and the manner in which they are associated;

Fig. 3 is a fragmentary sectional view similar to Fig. 2 illustrating in further detail the surface configuration of the backing sheet and the manner in which the padding material and fabric finish material are mounted thereon;

Fig. 4 is an enlarged fragmentary sectional view taken substantially on the line 4—4 of Fig. 1 illustrating in detail the construction of the inner trim panel;

Fig. 5 is a fragmentary sectional view taken substantially on the line 5—5 of Fig. 1 illustrating in further detail the manner in which the fabric finish material is secured to the backing sheet of the improved panel at the marginal edges thereof.

With more particular reference to the drawing it will be readily understood that the specific trim panel construction shown therein illustrates but one preferred embodiment of the present invention. It will be appreciated that the specific surface configuration of the inner trim panel shown is merely illustrative of the broad inventive concept presented in this application.

In the specific embodiment of the invention illustrated in the drawing, it will be readily appreciated that a novel and unique form of backing sheet is utilized in connection with the improved inner trim panel construction shown. Heretofore, it has been customary to make the backing sheet for inner trim panels of this general character from a single relatively heavy sheet of cardboard or similar material which is stamped out to provide a peripheral configuration substantially identical with the trim panel it is desired to produce. As will hereinafter be more clearly appreciated, it has been found exceedingly difficult to preform or emboss a relatively heavy piece of cardboard in order to obtain the necessary surface configuration for use in connection with the manufacture of improved inner trim panels embodying the features of the present invention. Consequently, the backing sheet shown comprises a pair of sections of cardboard or similar fibrous material 6 and 7 respectively and it will be noted by reference to Figs. 2 to 5, inclusive, that the upper section 7 is of substantially less thickness than the lower section 6. Both sections of cardboard material are blanked out to provide an exterior configuration substantially of the size and shape of the trim panel to be formed and substantially congruent to each other. The upper section 7 is then embossed by means of suitable dies to provide a plurality of ridges 8 extending throughout predetermined areas of the surface thereof, which ridges cooperate with the padding and fabric finish material in the manner hereinafter described to produce a novel and unique exterior finish for the completed trim panel.

It has been found that by utilizing a composite backing sheet made of a pair of sections of cardboard material of different thickness, the thinner of these sections may conveniently be embossed without material damage to the structure of the cardboard. It has been found that if attempts are made to emboss cardboard of sufficiently heavy thickness to provide the inherent rigidity necessary for trim panels of this type, the surface and general grain of the backing sheet as a whole is broken and the results of the embossing are wholly unsatisfactory for the purpose for which they were intended. However, it has been found that relatively light weight cardboard may be conveniently embossed to provide the desired surface configuration and that when the section 7 has been embossed in this manner it may conveniently adhesively be secured to the main backing sheet 6 by means of a suitable layer of adhesive 9, thus providing a composite or laminated backing sheet made up of two substantially congruent sections of cardboard material and having a surface configuration of the desired ornamentation as will hereinafter be more clearly seen.

It will be readily appreciated that the surface section 7 of the composite backing sheet may be embossed in the manner shown or any other suitable manner to provide any suitable pattern which may be desired and the embossed portions of the backing sheet will materially contribute to the exterior appearance of the trim panel as a whole. In the specific illustration shown in the drawing, the backing sheet is embossed to provide a plurality of pairs of vertically extending ridges 8, extending substantially parallel to each other and interrupted at their central portions to define relatively circular recesses 10 which serve to provide a convenient recess for mounting the ornamental buttons as will hereinafter be seen. The vertically extending ridges or grooves 8 serve to interconnect a pair of transversely extending ridges 11. In the specific embodiment of the invention shown, three adjacent ridges 11 are provided, creating therebetween a pair of recesses to which the fabric finish material may be secured as hereinafter described in detail.

Additional surface decoration in the form of ridges 13 may be provided adjacent the upper edges of the panel as clearly shown in Figs. 1 and 5.

After the surface member 7 of the composite backing sheet has been embossed to the desired configuration, this member is adhesively and permanently secured to the main portion of the backing sheet 6 by means of the layer of adhesive material 9. Isolated areas of loosely felted jute padding material are then stamped out to predetermined form. These isolated sections of padding material 12 are adhesively secured to the trim panel throughout the unembossed areas thereof. The specific manner in which these isolated sections of padding material can be applied to the backing sheet forms no part of the present invention and may be applied thereto in many and various different ways. In order to obtain a more complete understanding of this phase of the present method, reference may be made to applicant's assignee's prior co-pending application Serial No. 99,229, filed September 3, 1936, in which a particularly satisfactory method is illustrated for adhesively securing these relatively isolated sections of padding material upon a backing sheet.

After the sections of padding material 12 have been adhesively secured to the unembossed portion of the backing sheet, the embossed portions of the backing sheet may be covered with suitable adhesive material, and also adhesive may be applied to the surface of the padding material. A section of woven fabric finish material 15 of a configuration substantially similar to that of the trim panel which it is intended to cover is then stretched over the padded backing sheet and the marginal edges of this fabric finish material are reversely bent and adhesively secured to the rear side of the main backing sheet 6 as is illustrated in Fig. 5. During this operation, the fabric finish material is smoothly tensioned over the padded surface of the backing sheet and after the material has been stretched, the trim panel is placed in a suitable press and subjected to the action of a die which is in some respects similar to the embossing die referred to above, and serves to urge the fabric finish material down into the grooves formed between adjacent ridges on the embossed backing sheet. Here the fabric finish material is retained due to the presence of the adhesive on the embossed portion of the panel. Due to the fact that grooves are provided between the adjacent ridges, it will be seen that the fabric finish material smoothly curves over the marginal edges of the padding material and makes a neat attractive rounded corner at this point, which corners are substantially uniform in construction and lend a striking uniformity of appearance in the completed trim panels.

It will be seen that the adhesive covering the embossed portions of the backing sheet will firmly retain the fabric finish material in the position in which it was urged by the die and consequently, when the adhesive material has set, the trim panel as a whole will be provided with surface decorations conforming substantially to the general embossing on the backing sheet. In order to complete the assembly of the panel as a whole buttons 18 may be secured in the areas defined by the ridges 10 in order to aid in retaining the fabric finish material in place and also lend to the general ornamental appearance of the trim panel as a whole. These buttons may be secured in position by any suitable means conventional in the art.

It will be appreciated that while but one specific embodiment of the invention has been illustrated in the drawing and described above, many other and further modifications thereof falling within the scope of the invention as defined in the sub-joined claims will be clearly apparent to those skilled in the art.

What I claim is:

1. A vehicle trim panel comprising a cardboard backing sheet, a second cardboard backing sheet co-extensive therewith secured thereto, said second cardboard backing sheet having portions of the surface thereof embossed upwardly to provide surface decorations thereon, padding material secured to said second backing sheet in the unembossed portions thereof and having the marginal edges thereof adjacent said upwardly embossed decorations and fabric finish material stretched over said padded backing sheet and secured thereto in the embossed portions thereof.

2. The method of making inner trim panels which includes blanking out a pair of substantially congruent backing sheets, embossing one of said backing sheets to provide upwardly projecting decorations in portions thereo, adhesively securing said backing sheets together, adhesively securing sections of padding in the unembossed areas of said embossed backing sheet with the marginal edges of said pad abutting against said upwardly projecting decorations, and securing a section of fabric finish material on said padded backing sheet.

3. The method of making inner trim panels which includes blanking out a pair of substantially congruent backing sheets, embossing one of said backing sheets to provide upwardly projecting decorations in portions thereof, adhesively securing said backing sheets together, adhesively securing sections of padding in the unembossed areas of said embossed backing sheet with the marginal edges thereof positioned by and abutting against said upwardly projecting decorations, stretching a section of fabric finish over said padded backing sheet, and adhesively securing said fabric finish material in the embossed zones of said backing sheet.

WILLIAM C. OSBORN.